(12) United States Patent
Fernandez et al.

(10) Patent No.: US 8,838,463 B2
(45) Date of Patent: Sep. 16, 2014

(54) ADAPTIVE DIRECT TRANSACTION FOR NETWORK CLIENT GROUP

(76) Inventors: Dennis S. Fernandez, Atherton, CA (US); Irene Hu, Sunnyvale, CA (US)

( * ) Notice: Subject to any disclaimer, the term of this patent is extended or adjusted under 35 U.S.C. 154(b) by 838 days.

(21) Appl. No.: 12/239,593

(22) Filed: Sep. 26, 2008

(65) Prior Publication Data

US 2009/0037435 A1 Feb. 5, 2009

Related U.S. Application Data

(63) Continuation of application No. 09/145,167, filed on Sep. 1, 1998, now Pat. No. 7,769,620.

(51) Int. Cl.
| | |
|---|---|
| *G06Q 50/00* | (2012.01) |
| *G06Q 40/00* | (2012.01) |
| *G06Q 30/02* | (2012.01) |
| *G06Q 30/06* | (2012.01) |
| *H04L 29/08* | (2006.01) |

(52) U.S. Cl.
CPC ............... *G06Q 30/02* (2013.01); *G06Q 40/12* (2013.01); *G06Q 30/0239* (2013.01); *G06Q 30/0253* (2013.01); *G06Q 30/0625* (2013.01); *H04L 67/22* (2013.01); *G06Q 30/0277* (2013.01); *G06Q 30/0251* (2013.01); *Y10S 707/99931* (2013.01); *H04L 67/20* (2013.01); *G06Q 30/0201* (2013.01); *H04L 67/12* (2013.01); *Y10S 707/99933* (2013.01); *G06Q 30/0222* (2013.01)
USPC ...... 705/3; 705/2; 707/999.001; 707/999.003

(58) Field of Classification Search
USPC .................. 705/2, 3, 1.1, 7.11; 600/300, 301; 702/19, 20, 22, 30, 31
See application file for complete search history.

(56) References Cited

U.S. PATENT DOCUMENTS

| | | |
|---|---|---|
| 3,568,161 A | 3/1971 | Knickel |
| 3,683,114 A | 8/1972 | Egan et al. |
| 3,828,306 A | 8/1974 | Angeloni |
| 3,914,692 A | 10/1975 | Seaborn, Jr. |
| 3,980,948 A | 9/1976 | Olive |
| 3,986,119 A | 10/1976 | Hemmer, Jr. et al. |

(Continued)

FOREIGN PATENT DOCUMENTS

| | | |
|---|---|---|
| EP | 0718614 | 6/1996 |
| EP | 0748727 A1 | 12/1996 |

(Continued)

OTHER PUBLICATIONS

"Shopper's Eye: Using Location-based Filtering for a Shopping Agent in the Physical World", Andrew E. Fano, http://www.accenture.com/SiteCollectionDocuments/jp-ja/PDF/technology/emerging-technology/mobile-solutions/Accenture_technology_shopperseyeagents98.pdf.*

(Continued)

*Primary Examiner* — Igor Borissov
(74) *Attorney, Agent, or Firm* — Fernandez & Associates, LLP

(57) ABSTRACT

Internet-based software and associated database provide group analysis overlay to monitor client-server web traffic and provide direct marketing to client group. Client car, patient, office or school sensor and interface provides overlay attribute for database comparison to classify usage pattern, location, timing, or family for targeted messaging for enhanced service from server source. Database group registry tracks client classification and provides adaptive context mapping according to set attribute relative to targeted on-line transaction.

1 Claim, 6 Drawing Sheets

(56) References Cited

U.S. PATENT DOCUMENTS

| | | | |
|---|---|---|---|
| 4,002,983 A | 1/1977 | Kavalir et al. | |
| 4,067,411 A | 1/1978 | Conley et al. | |
| 4,084,241 A | 4/1978 | Tsumura | |
| 4,139,889 A | 2/1979 | Ingels | |
| 4,162,377 A | 7/1979 | Mearns | |
| 4,229,620 A | 10/1980 | Schaible | |
| 4,369,426 A | 1/1983 | Merkel | |
| 4,616,214 A | 10/1986 | Naito | |
| 4,687,732 A | 8/1987 | Ward et al. | |
| 4,707,926 A | 11/1987 | Decker, Jr. | |
| 4,710,955 A | 12/1987 | Kauffman | |
| 4,755,872 A | 7/1988 | Bestler et al. | |
| 4,757,267 A | 7/1988 | Riskin | |
| 4,763,418 A | 8/1988 | Decker, Jr. | |
| 4,833,477 A | 5/1989 | Tendler | |
| 4,891,650 A | 1/1990 | Sheffer | |
| 4,965,821 A | 10/1990 | Bishop et al. | |
| 4,982,346 A | 1/1991 | Girouard et al. | |
| 5,003,584 A | 3/1991 | Benyacar et al. | |
| 5,043,736 A | 8/1991 | Darnell et al. | |
| 5,119,102 A | 6/1992 | Barnard | |
| 5,131,020 A | 7/1992 | Liebesny et al. | |
| 5,159,315 A | 10/1992 | Schultz et al. | |
| 5,196,846 A | 3/1993 | Brockelsby et al. | |
| 5,208,706 A | 5/1993 | Lemelson | |
| 5,208,756 A | 5/1993 | Song | |
| 5,218,367 A | 6/1993 | Sheffer et al. | |
| 5,223,844 A | 6/1993 | Mansell et al. | |
| 5,225,842 A | 7/1993 | Brown et al. | |
| 5,272,483 A | 12/1993 | Kato | |
| 5,278,568 A | 1/1994 | Enge et al. | |
| 5,283,829 A | 2/1994 | Anderson | |
| 5,296,963 A | 3/1994 | Murakami et al. | |
| 5,319,363 A | 6/1994 | Welch et al. | |
| 5,323,322 A | 6/1994 | Mueller et al. | |
| 5,327,144 A | 7/1994 | Stilp et al. | |
| 5,334,974 A | 8/1994 | Simms et al. | |
| 5,335,140 A | 8/1994 | Kamino et al. | |
| 5,341,140 A | 8/1994 | Perry | |
| 5,343,493 A | 8/1994 | Karimullah | |
| 5,365,451 A | 11/1994 | Wang et al. | |
| 5,388,147 A | 2/1995 | Grimes | |
| 5,390,238 A | 2/1995 | Kirk et al. | |
| 5,396,227 A | 3/1995 | Carroll et al. | |
| 5,398,190 A | 3/1995 | Wortham | |
| 5,400,018 A | 3/1995 | Scholl et al. | |
| 5,416,695 A | 5/1995 | Stutman et al. | |
| 5,418,526 A | 5/1995 | Crawford | |
| 5,418,538 A | 5/1995 | Lau | |
| 5,422,624 A | 6/1995 | Smith | |
| 5,422,816 A | 6/1995 | Sprague et al. | |
| 5,432,542 A | 7/1995 | Thibadeau et al. | |
| 5,432,841 A | 7/1995 | Rimer | |
| 5,441,047 A | 8/1995 | David et al. | |
| 5,442,553 A | 8/1995 | Parrillo | |
| 5,444,450 A | 8/1995 | Olds et al. | |
| 5,458,123 A | 10/1995 | Unger | |
| 5,459,660 A | 10/1995 | Berra | |
| 5,465,079 A | 11/1995 | Bouchard | |
| 5,477,228 A | 12/1995 | Tiwari et al. | |
| 5,479,479 A | 12/1995 | Braitberg et al. | |
| 5,479,482 A | 12/1995 | Grimes | |
| 5,481,542 A | 1/1996 | Logston et al. | |
| 5,504,482 A | 4/1996 | Schreder | |
| 5,506,897 A | 4/1996 | Moore et al. | |
| 5,510,798 A | 4/1996 | Bauer | |
| 5,512,908 A | 4/1996 | Herrick | |
| 5,515,043 A | 5/1996 | Berard et al. | |
| 5,515,285 A | 5/1996 | Garrett, Sr. et al. | |
| 5,515,419 A | 5/1996 | Sheffer | |
| 5,519,760 A | 5/1996 | Borkowski et al. | |
| 5,539,395 A * | 7/1996 | Buss et al. | 340/7.43 |
| 5,543,789 A | 8/1996 | Behr et al. | |
| 5,544,661 A | 8/1996 | Davis et al. | |
| 5,555,286 A | 9/1996 | Tendler | |
| 5,556,749 A | 9/1996 | Mitsuhashi et al. | |
| 5,557,254 A | 9/1996 | Johnson et al. | |
| 5,561,704 A | 10/1996 | Salimando | |
| 5,572,204 A | 11/1996 | Timm et al. | |
| 5,576,716 A | 11/1996 | Sadler | |
| 5,576,952 A | 11/1996 | Stutman et al. | |
| 5,579,013 A | 11/1996 | Hershey et al. | |
| 5,579,285 A | 11/1996 | Hubert | |
| 5,583,776 A | 12/1996 | Levi et al. | |
| 5,588,148 A | 12/1996 | Landis et al. | |
| 5,598,456 A | 1/1997 | Feinberg | |
| 5,598,460 A | 1/1997 | Tendler | |
| 5,610,815 A | 3/1997 | Gudat et al. | |
| 5,615,116 A | 3/1997 | Gudat et al. | |
| 5,625,668 A | 4/1997 | Loomis et al. | |
| 5,630,206 A | 5/1997 | Urban et al. | |
| 5,632,041 A | 5/1997 | Peterson et al. | |
| 5,640,323 A | 6/1997 | Kleimenhagen et al. | |
| 5,646,843 A | 7/1997 | Gudat et al. | |
| 5,652,570 A | 7/1997 | Lepkofker | |
| 5,669,061 A | 9/1997 | Schipper | |
| 5,673,305 A | 9/1997 | Ross | |
| 5,686,910 A | 11/1997 | Timm et al. | |
| 5,687,215 A | 11/1997 | Timm et al. | |
| 5,696,503 A | 12/1997 | Nasburg et al. | |
| 5,701,419 A | 12/1997 | McConnell | |
| 5,706,498 A | 1/1998 | Fujimiya et al. | |
| 5,708,780 A | 1/1998 | Levergood et al. | |
| 5,712,899 A | 1/1998 | Pace, II | |
| 5,724,070 A | 3/1998 | Denninghoff et al. | |
| 5,726,893 A | 3/1998 | Schuchman et al. | |
| 5,727,057 A | 3/1998 | Emery et al. | |
| 5,732,074 A | 3/1998 | Spaur et al. | |
| 5,732,125 A | 3/1998 | Oyama | |
| 5,737,700 A | 4/1998 | Cox et al. | |
| 5,740,549 A | 4/1998 | Reilly et al. | |
| 5,745,681 A | 4/1998 | Levine et al. | |
| 5,764,923 A | 6/1998 | Tallman et al. | |
| 5,774,357 A | 6/1998 | Hoffberg et al. | |
| 5,774,850 A * | 6/1998 | Hattori et al. | 704/250 |
| 5,806,018 A | 9/1998 | Smith et al. | |
| 5,808,197 A | 9/1998 | Dao | |
| 5,808,564 A | 9/1998 | Simms et al. | |
| 5,808,907 A | 9/1998 | Shetty et al. | |
| 5,826,195 A | 10/1998 | Westerlage et al. | |
| 5,829,782 A | 11/1998 | Breed et al. | |
| 5,840,020 A | 11/1998 | Heinonen et al. | |
| 5,848,373 A | 12/1998 | DeLorme et al. | |
| 5,848,396 A | 12/1998 | Gerace | |
| 5,857,155 A | 1/1999 | Hill et al. | |
| 5,867,799 A | 2/1999 | Lang et al. | |
| 5,867,821 A | 2/1999 | Ballantyne et al. | |
| 5,869,244 A | 2/1999 | Martin et al. | |
| 5,875,108 A | 2/1999 | Hoffberg et al. | |
| 5,878,141 A | 3/1999 | Daly et al. | |
| 5,878,417 A | 3/1999 | Baldwin et al. | |
| 5,893,111 A | 4/1999 | Sharon et al. | |
| 5,895,371 A | 4/1999 | Levitas et al. | |
| 5,901,978 A | 5/1999 | Breed et al. | |
| 5,917,405 A | 6/1999 | Joao | |
| 5,933,080 A | 8/1999 | Nojima | |
| 5,933,827 A | 8/1999 | Cole et al. | |
| 5,940,004 A | 8/1999 | Fulton | |
| 5,940,821 A | 8/1999 | Wical | |
| 5,959,580 A | 9/1999 | Maloney et al. | |
| 5,987,381 A | 11/1999 | Oshizawa | |
| 5,987,519 A | 11/1999 | Peifer et al. | |
| 5,991,735 A | 11/1999 | Gerace | |
| 6,014,090 A | 1/2000 | Rosen et al. | |
| 6,016,509 A | 1/2000 | Dedrick | |
| 6,018,292 A | 1/2000 | Penny, Jr. | |
| 6,023,729 A | 2/2000 | Samuel et al. | |
| 6,025,788 A | 2/2000 | Diduck | |
| 6,028,537 A | 2/2000 | Suman et al. | |
| 6,032,054 A | 2/2000 | Schwinke | |
| 6,047,327 A | 4/2000 | Tso et al. | |
| 6,061,561 A | 5/2000 | Alanara et al. | |
| 6,064,970 A | 5/2000 | McMillan et al. | |
| 6,067,500 A | 5/2000 | Morimoto et al. | |

(56) References Cited

U.S. PATENT DOCUMENTS

| | | | |
|---|---|---|---|
| 6,081,780 A | 6/2000 | Lumelsky | |
| 6,083,248 A | 7/2000 | Thompson | |
| 6,104,338 A | 8/2000 | Krasner | |
| 6,122,520 A | 9/2000 | Want et al. | |
| 6,128,482 A | 10/2000 | Nixon et al. | |
| 6,131,067 A | 10/2000 | Girerd et al. | |
| 6,141,010 A * | 10/2000 | Hoyle | 715/854 |
| 6,150,927 A | 11/2000 | Nesbitt | |
| 6,150,961 A | 11/2000 | Alewine et al. | |
| 6,151,551 A | 11/2000 | Geier et al. | |
| 6,161,125 A | 12/2000 | Traversat et al. | |
| 6,177,931 B1 | 1/2001 | Alexander et al. | |
| 6,195,654 B1 | 2/2001 | Wachtel | |
| 6,211,777 B1 | 4/2001 | Greenwood et al. | |
| 6,219,696 B1 | 4/2001 | Wynblatt et al. | |
| 6,246,672 B1 | 6/2001 | Lumelsky | |
| 6,250,148 B1 | 6/2001 | Lynam | |
| 6,252,544 B1 | 6/2001 | Hoffberg | |
| 6,263,268 B1 | 7/2001 | Nathanson | |
| 6,263,384 B1 | 7/2001 | Yanase | |
| 6,269,394 B1 | 7/2001 | Kenner et al. | |
| 6,275,231 B1 | 8/2001 | Obradovich | |
| 6,292,698 B1 * | 9/2001 | Duffin et al. | 607/32 |
| 6,295,449 B1 | 9/2001 | Westerlage et al. | |
| 6,308,175 B1 | 10/2001 | Lang et al. | |
| 6,314,420 B1 | 11/2001 | Lang et al. | |
| 6,314,422 B1 | 11/2001 | Barker et al. | |
| 6,317,090 B1 | 11/2001 | Nagy et al. | |
| 6,324,393 B1 | 11/2001 | Doshay | |
| 6,332,086 B2 | 12/2001 | Avis | |
| 6,333,703 B1 | 12/2001 | Alewine et al. | |
| 6,339,842 B1 | 1/2002 | Fernandez et al. | |
| 6,341,523 B2 | 1/2002 | Lynam | |
| 6,363,421 B2 | 3/2002 | Barker et al. | |
| 6,374,290 B1 | 4/2002 | Scharber et al. | |
| 6,400,690 B1 | 6/2002 | Liu et al. | |
| 6,405,132 B1 | 6/2002 | Breed et al. | |
| 6,415,188 B1 | 7/2002 | Fernandez et al. | |
| 6,429,812 B1 | 8/2002 | Hoffberg | |
| 6,430,488 B1 | 8/2002 | Goldman et al. | |
| 6,434,400 B1 | 8/2002 | Villevieille et al. | |
| 6,484,080 B2 | 11/2002 | Breed | |
| 6,493,637 B1 | 12/2002 | Steeg | |
| 6,516,664 B2 | 2/2003 | Lynam | |
| 6,535,743 B1 | 3/2003 | Kennedy, III et al. | |
| 6,539,336 B1 | 3/2003 | Vock et al. | |
| 6,542,076 B1 | 4/2003 | Joao | |
| 6,542,794 B2 | 4/2003 | Obradovich | |
| 6,549,130 B1 | 4/2003 | Joao | |
| 6,580,390 B1 | 6/2003 | Hay | |
| 6,580,904 B2 | 6/2003 | Cox et al. | |
| 6,587,046 B2 | 7/2003 | Joao | |
| 6,590,602 B1 | 7/2003 | Fernandez et al. | |
| 6,647,328 B2 | 11/2003 | Walker | |
| 6,678,612 B1 | 1/2004 | Khawam | |
| 6,697,103 B1 | 2/2004 | Fernandez et al. | |
| 6,720,920 B2 | 4/2004 | Breed et al. | |
| 6,735,506 B2 | 5/2004 | Breed et al. | |
| 6,754,485 B1 | 6/2004 | Obradovich et al. | |
| 6,768,944 B2 | 7/2004 | Breed et al. | |
| 6,791,472 B1 | 9/2004 | Hoffberg | |
| 6,792,263 B1 | 9/2004 | Kite | |
| 6,807,558 B1 | 10/2004 | Hassett et al. | |
| 6,813,777 B1 | 11/2004 | Weinberger et al. | |
| 6,816,727 B2 | 11/2004 | Cox et al. | |
| 6,823,244 B2 | 11/2004 | Breed | |
| 6,826,775 B1 | 11/2004 | Howe et al. | |
| 6,832,178 B1 | 12/2004 | Fernandez et al. | |
| 6,853,907 B2 | 2/2005 | Peterson et al. | |
| 6,868,389 B1 | 3/2005 | Wilkins et al. | |
| 6,871,139 B2 | 3/2005 | Liu et al. | |
| 6,882,837 B2 | 4/2005 | Fernandez et al. | |
| 6,882,905 B2 | 4/2005 | Hall et al. | |
| 6,922,664 B1 | 7/2005 | Fernandez et al. | |
| 6,950,638 B2 | 9/2005 | Videtich et al. | |
| 6,963,899 B1 | 11/2005 | Fernandez et al. | |
| 6,965,816 B2 | 11/2005 | Walker | |
| 6,968,736 B2 | 11/2005 | Lynam | |
| 6,987,964 B2 | 1/2006 | Obradovich et al. | |
| 6,988,026 B2 | 1/2006 | Breed et al. | |
| 7,039,393 B1 | 5/2006 | Kite | |
| 7,042,363 B2 | 5/2006 | Katrak et al. | |
| 7,062,379 B2 | 6/2006 | Videtich | |
| 7,082,359 B2 | 7/2006 | Breed | |
| 7,084,859 B1 | 8/2006 | Pryor | |
| 7,085,637 B2 | 8/2006 | Breed et al. | |
| 7,103,460 B1 | 9/2006 | Breed | |
| 7,113,860 B2 | 9/2006 | Wang | |
| 7,124,004 B2 | 10/2006 | Obradovich | |
| 7,142,099 B2 | 11/2006 | Ross et al. | |
| 7,142,844 B2 | 11/2006 | Obradovich et al. | |
| 7,147,246 B2 | 12/2006 | Breed et al. | |
| 7,155,335 B2 | 12/2006 | Rennels | |
| 7,164,177 B2 | 1/2007 | Chang et al. | |
| 7,165,040 B2 | 1/2007 | Ehrman et al. | |
| 7,171,381 B2 | 1/2007 | Ehrman et al. | |
| 7,203,300 B2 | 4/2007 | Shaffer et al. | |
| 7,231,357 B1 | 6/2007 | Shanman et al. | |
| 2001/0007086 A1 | 7/2001 | Rogers et al. | |
| 2001/0020236 A1 * | 9/2001 | Cannon | 707/1 |
| 2001/0056544 A1 | 12/2001 | Walker | |
| 2002/0001317 A1 | 1/2002 | Herring | |
| 2002/0034757 A1 | 3/2002 | Cubicciotti | |
| 2002/0049389 A1 | 4/2002 | Abreu | |
| 2004/0215931 A1 | 10/2004 | Ellis | |
| 2005/0125117 A1 | 6/2005 | Breed | |

FOREIGN PATENT DOCUMENTS

| | | |
|---|---|---|
| EP | 0921411 | 9/1999 |
| GB | 2261977 A | 2/1993 |
| GB | 2320973 | 7/1998 |
| JP | 8076706 | 3/1996 |
| WO | WO 95/15658 | 6/1995 |
| WO | WO 95/22131 | 8/1995 |
| WO | WO 97/26061 | 7/1997 |
| WO | WO 97/29373 | 7/1997 |

OTHER PUBLICATIONS

"Shoppers Eye: Using Location-based Filtering for a Shopping Agent in the Physical World", Andrew E. Fano, the Internet print-out, May 10-13, 1998; pp. 6.*

General Motors Corp., Corrected Request for Ex Parte Reexamination, from U.S. Patent Reexamination Control No. 90/010,397 (filed Feb. 10, 2009).

Fernandez Innovative Technologies, L.L.C., Plaintiffs Opening Claim Construction Brief, *Fernandez Innovative Tech., L.L.C.* v. *General Motors Corp.*, No. 07-cv-01397, 2008 WL 2168843 (N.D. Ill. Dec. 18, 2007).

Fernandez Innovative Technologies, L.L.C., Plaintiffs Reply Brief in Support of its Claim Construction Argument, *Fernandez Innovative Tech., L.L.C.* v. *General Motors Corp.*, No. 07-cv-01397, 2008 WL 2168843 (N.D. Ill. Feb. 8, 2008).

Fernandez Innovative Technologies, L.L.C., Brief of Plaintiff-Appellant, *Fernandez Innovative Tech., L.L.C.* v. *General Motors Corp.*, 2008-1533 (Fed. Cir. Oct. 23, 2008).

USPTO, Final Rejection, from U.S. Appl. No. 09/952,285 (action mailed Nov. 24, 2004).

Fernandez, D., Appeal Brief, from U.S. Appl. No. 09/952,285 (brief filed Feb. 10, 2005).

General Motors Corp., Exhibits M-R (Claim Charts), from U.S. Patent Reexamination Control No. 90/010,397 (filed Jan. 27, 2009).

Akhtar Jameel, Exel Fuchs, Internet Multimedia on Wheels, Media Briefing, Apr. 30, 1997.

Akhtar Jameel, Exel Fuchs, Internet Multimedia on Wheels, Media Briefing, Apr. 30, 1997 more.

Alison Brown & Randy Silva, Tidget Mayday System for Motorists, in Proceedings of the postion location and navigation symposium (IEEE 1994).

(56) References Cited

OTHER PUBLICATIONS

CT Caskey, Diagnosis of Human Heritable Defects by Recombinant DNA Methods, Phil. Trans.R.Soc.Lon. Jun. 15, 1988, 353-60 vol. 319, NO1194.

Engage Technologies, Inc. Press Released, "Accipiter Announces Accipiter AD Manager a Breakthrough Internet Advertising and Marketing", Sep. 9, 1996, 2 pgs, Saybold Conf., SF.

Engage Technologies, Inc. Press Released, "Engage Announces Accipiter Ad Manager 4.0 for Precision on line Marketing", Aug. 10, 1998, (Jupiter Online Advertising Show, NY).

"Evaluation Mgr., Argonne Nat'l Lab, The Advanced Project:FormalEvaluation of the Targeted Deployment, vol. 1, U.S. Dept. of Transp. Jan. 1997".

"Evaluation Mgr., Argonne Nat'l Lab, The Advanced Project:FormalEvaluation of the Targeted Deployment, vol. 2, U.S. Dept. of Transp. Jan. 1997".

"Evaluation Mgr., Argonne Nat'l Lab, The Advanced Project:FormalEvaluation of the Targeted Deployment, vol. 3, U.S. Dept. of Transp. Jan. 1997".

Fred Charatan, US unveils new DNA database British Medical Journal, Nov. 7, 1998.

Grigsby et al. "Telemedicine: Where it is and where it is going" Jul. 15, 1998, Annalas of Internal Medicine, vol. 129, No. 2, pp. 123-126.

Hassan Karimi & J. Tom Lockhart, GPS—Based Tracking Sys. For Taxi Cab Fleet Operations, in Proceedings of the Vehicle Navigation and Information Systems Conference.

John Markoff, Daimler-Benz to Exhibit an Early-State Internet Car.

Julian Steed, The Management of Dangerous Goods Transport: The European Approach, in Proceedings of the Vehicle Navigation and Information Systems Conference, Ottawa, Ontario.

Karamouch, A. "Multimedia Distributed Cooperative System" Sep. 1993, Computer Communications, vol. 16, No. 9, pp. 568-580.

Max Cameron & Alison Brown, Intelligent Transportation System Mayday Becomes a Reality, in IEEE 1995 Natl. Aerosp. and Elec. Conf. 1995.

Shigeru Sassa, How genetics are identified, Clinics in dermatology, Mar. 4, 1998, 235-243, vol. 16 Issue 2.

The HAVI Architecture, Draft May 11, 1998, Version 0.8, by Gundig, Hitachi, Matsushita, Philips, Sharp, Sony, Thompson, and Toshiba.

Todd Carstensen, "OnStar-First with Remote Diagnostics, "OnStar Press Release, http://209.235.195.221/releases_detail.php?ItemID=89,Sep. 4, 1997, OnStar by GM Website.

Transportation Electronics: Proceedings of the International Congress on Transportation Electronics, Society of Automotive Engineers, Inc., Warrendale, PA Oct. 1986.

US Dept. Of Transportation, Technology Alternatives for an Automated Collision Notification System, Final Report, National Technical Service, Springfield, VA 22161.

Vieveen et al., Telematics and Dangerous Goods in the Netherlands, in Proceedings of the Vehicle Navigation and Information Systems Conference, Ottawa, Ontario (IEEE 1993).

Winnie Shows, Video Clip List.

"SNET Announces Major Entry Into Health Care Market: SNET LifeNet Solutions," PR Newswire, Dec. 3, 1996.

U.S. Appl. No. 90/010,397, filed Feb. 10, 2009, Reexamination of US 6,963,899 (issued Nov. 8, 2005), Fernandez et al.

\* cited by examiner

ADAPTIVE DIRECT TRANSACTION FOR NETWORK CLIENT GROUP

CROSS REFERENCE TO RELATED APPLICATION

This Application is a continuation application of U.S. patent application Ser. No. 09/145,167 originally filed on Sep. 1, 1998.

FIELD OF INVENTION

Invention relates to networked computer applications, particularly to distributed client-server software for adaptive direct group transaction.

BACKGROUND OF INVENTION

With the explosive growth of the Internet and its associated World-Wide Web, various computer programs have been developed for distributed applications between client and server processors interconnected through local and/or wide area networks. In particular, web-based software are provided variously for promoting, managing or otherwise transacting business on-line. Thus, such electronic commerce applications are provided to facilitate more efficient marketing and distribution of goods and services. However, prior-art approaches at facilitating on-line commerce are limited, particularly with respect to enabling direct marketing, especially for multiple targets or client groups.

SUMMARY OF INVENTION

Invention resides in software for directing on-line messages to classified client set adaptively according to monitored set characteristics. Memory stores set data associated with historically stored, currently measured, or preferred network configuration, on-line traffic, location, schedule, or affiliation. Clients are classified into sets per criteria for contextual mapping of particular sets to corresponding targeted on-line messages. Client sensor interface provides mobile location, medical condition, or other attribute for adaptive classification of client into sets by comparing attribute to set groupings. Updated client classification provides adaptive context mapping of sets to directed transactions.

DETAILED DESCRIPTION OF PREFERRED EMBODIMENTS

Figure 1:
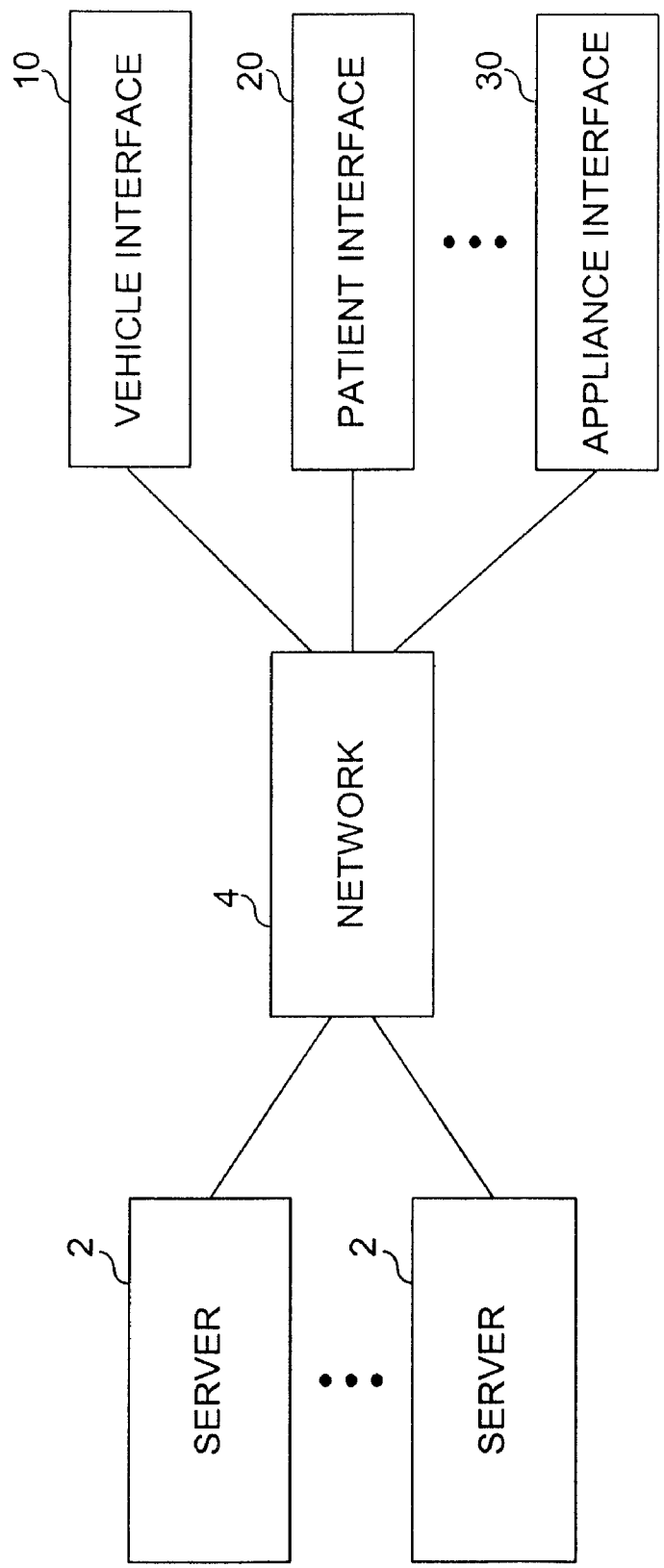
FIG. 1 is general block diagram for network system implementing present invention.

FIG. 1 block diagram shows network system 4 having one or more server processors or nodes 2 and one or more client processors or nodes 10, 20, 30, coupled thereto preferably according to standard Internet Protocol or other conventional digital networking and data communications scheme, which publicly available specifications are hereby referenced, as appropriate.

Preferably, client 10 represents network interface for vehicular or other mobile processing application, client 20 represents network interface for medical or other personal processing application, and client 30 represents network interface for appliance or other embedded processing application.

It is contemplated herein that network 4 may be embodied in conventional and/or proprietary, wired and/or wireless, hardware and/or software, integrated and/or modular means for sending and receiving digital data and/or electronic signals between processors, nodes or other addressable network sites coupled thereto. Moreover, it is contemplated that server or client processing functionality may be embodied in one or more processing machines or devices, and a single processing machine or device may perform functionality of multiple server and/or client processors.

Figure 2:
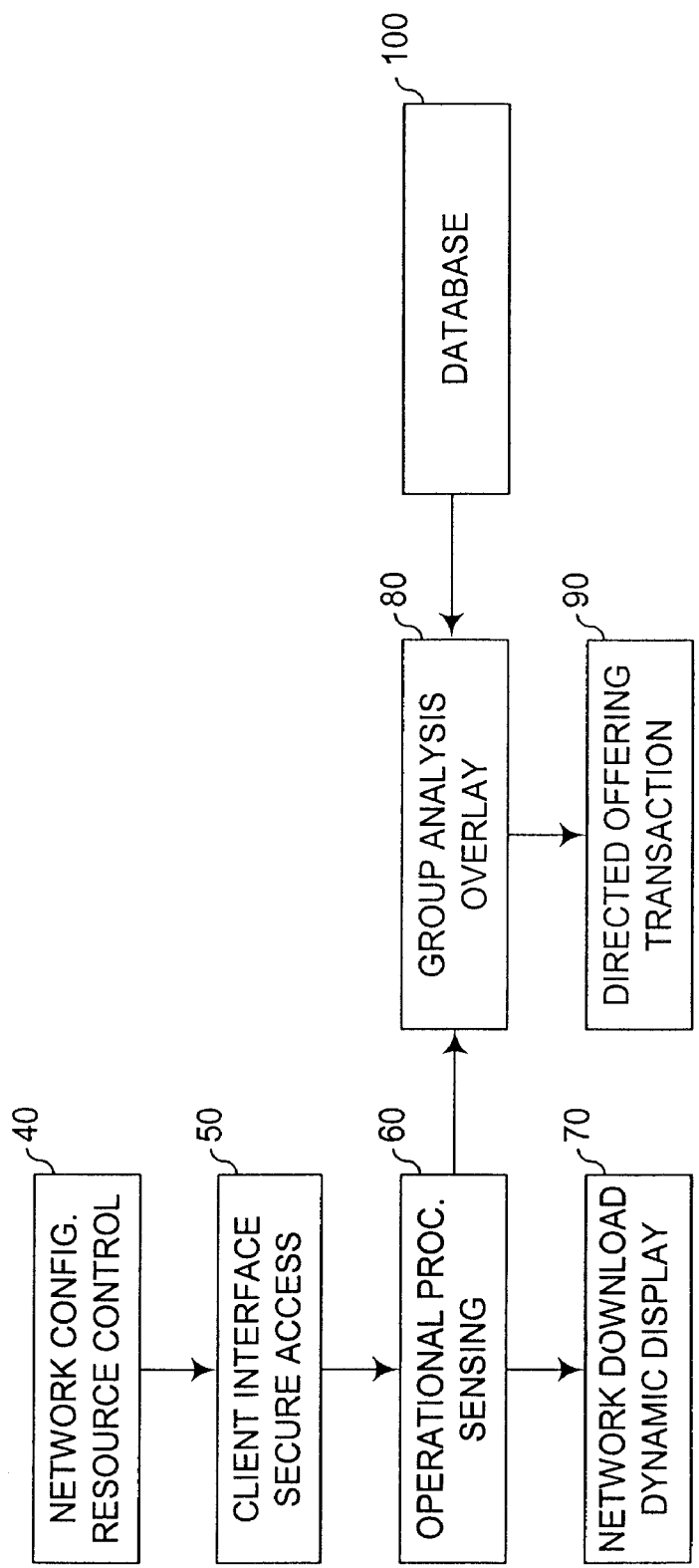
FIG. 2 is logic flow diagram of operational methodology for implementing present invention.

FIG. 2 flow chart shows process for network configuration and resource control 40, client interface and secure access 50, operational processing and sensing 60, network download and dynamic display 70, group analysis overlay 80, directed offering and transaction 90, and database access 100.

In accordance with present invention, network 4, including server(s) 2 and client(s) 10, 20, 30 employ software and/or other functionally equivalent firmware, hardware, or electronics for directing or targeting on-line messages or electronic signals to selected or classified client set or group adaptively or dynamically according to monitored or specified set characteristics or attributes. Preferably, such software functionality is implemented using embedded or real-time operating (RTOS) code convention, JAVA, C/C++, Windows/CE, or other equivalent digital signal processing instruction scheme, according to operational definition described herein.

Such software or functionality may use or cooperate for read/write operations with one or more digital memory or functionally equivalent network-accessible electronic storage to store data or attribute signals about one or more client 10, 20, 30 associated with previously stored, currently measured, or preferred network or node configuration, on-line network traffic, actual location, schedule events, or subscribed or qualified affiliation.

Preferably, clients 10, 20, 30 are classified into or otherwise associated with sets, super-sets, sub-sets, groups, super-groups, sub-groups, or other hierarchical category according to pre-specified or dynamically defined criteria for qualification therein. Particular set or sets may be logically mapped, assigned contextually or otherwise related to one or more corresponding targeted on-line message or electronic network signals, as described herein. In particular, client sensor interface may provide various monitored still images, live video, audio, states, data or attribute signals representative thereof, such as mobile location, medical condition, or other detectable attribute for adaptive or responsive classification of subject client into set(s) by comparing attribute and classifying appropriately into set groupings. For example, sensor may include one or more keyboard, screen or mouse entry, microphone, digital imaging or video camera, or position locator or navigational electronics, such as Global Positioning Satellite system (GPS) receiver functionality to provide certain dimensional and temporal (i.e., time and place) signals and values.

Additionally, client interface user interface is preferably implemented as dial-up or dedicated network connection web browser software, which provides secured access according to authenticated and/or encrypted user identification or messages. Optionally, user identification may be achieved by client interface determination of unique user physical or biological characteristic, such as sensor-sampled or input-verified personal genetic sequence.

Moreover, updated or modified client classifications effectively provide adaptive or dynamic context mapping of sets to directed transactions, messages, or signals representative thereof. For example, directed message, transaction or network signal may include commercial offering, application program, still image, or video stream.

Hence, during software operation of preferred implementation, one or more client attribute or signal is determined or generated initially, so that subject client may be classified in a set according to subject attribute (i.e., currently monitored or generated attribute signal); then, a message or transaction signal representative thereof is sent to clients classified in that set. Generally, subject attribute or generated signal may represent one or more monitored signals, data, or values, such as client location, elapsed or actual time, client or user entry selection, physical, mechanical, medical or other objective condition, as well as any affiliation or subscription associated with subject client.

More particularly, subject attribute value or signal may be provided by one or more client sensor, wherein such attribute is provided in digital memory or functionally equivalent electronic storage. Client may be classified by comparing the attribute with another attribute stored in memory to determine equivalence or non-equivalence, such that client is classified or not classified in the set, for example, according to predetermined substantial similarity determined therebetween.

Additionally, a second attribute of the client may be determined, wherein the client then may be classified in another or same set according to the second attribute. Another or same message or transaction signal may be sent to one or more clients classified in the second set. Moreover, a second attribute may be determined for another client, wherein such other client is classified in the second set according to the second attribute, and a second message or transaction signal is thereby sent to clients classified in the second set.

Figure 3:
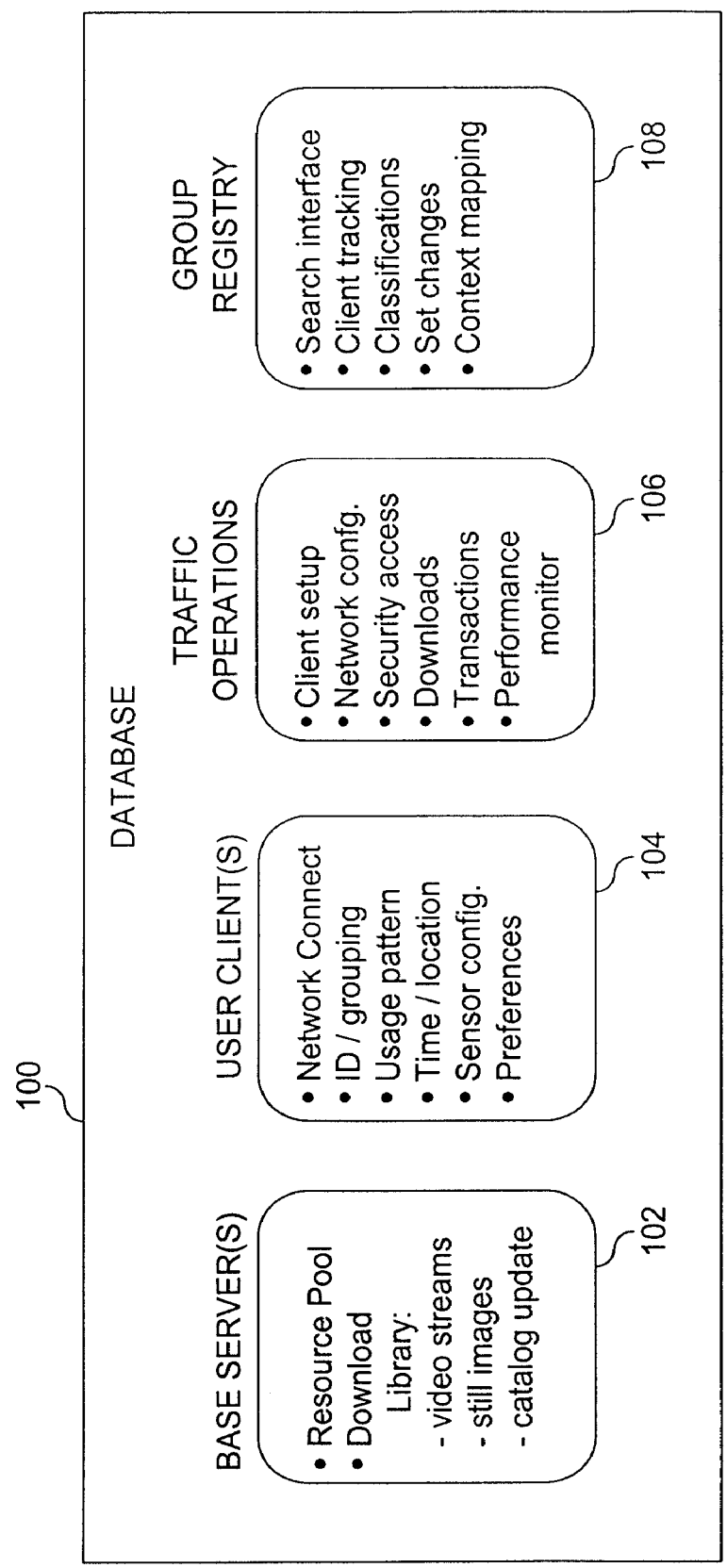
FIG. 3 is database diagram according to present invention.

FIG. 3 diagram represents database 100 of base server(s) 102, user client(s) 104, traffic operations 106, and group registry 108, which are one or more separately or collectively stored or accessible object-oriented and/or relational information modules or other networking or processing system cache or repositories, value or signals representative of functional activity associated respectively with one or more servers 2, client interfaces 10, 20 30, network 4 communications and configurations, and client set groupings, as described herein.

In particular, base server data module 102 includes electronically-accessible expert, service catalog, knowledge library, or other on-line or user self-service resource pool; and network-downloadable text, audio, still images, video clips or streams; or any update or revision thereof. User client or sensor site module 104 includes network client or server connection and configuration; client and/or group identifier or reference indicator; network usage or transaction history or pattern; monitored or sensed client attributes (e.g., time, location, temperature, available resources, etc.); client sensor configuration, status and condition, or client specified or inferred preferences.

Traffic operations or network manager module 106 includes client or sensor sites set-up sequence, configuration or log; security or authentication sequence, configuration or log; data transfer or signal transmission download or communication sequence, configuration or log; offering transaction sequence, configuration or log; and network operation or performance monitor or log. Client or user group or set registry module 108 includes group or set search interface sequence, configuration or log; user or client attribute tracking or monitoring; group or set classifications or criteria; or context mapping or other directed message association.

Figure 4:
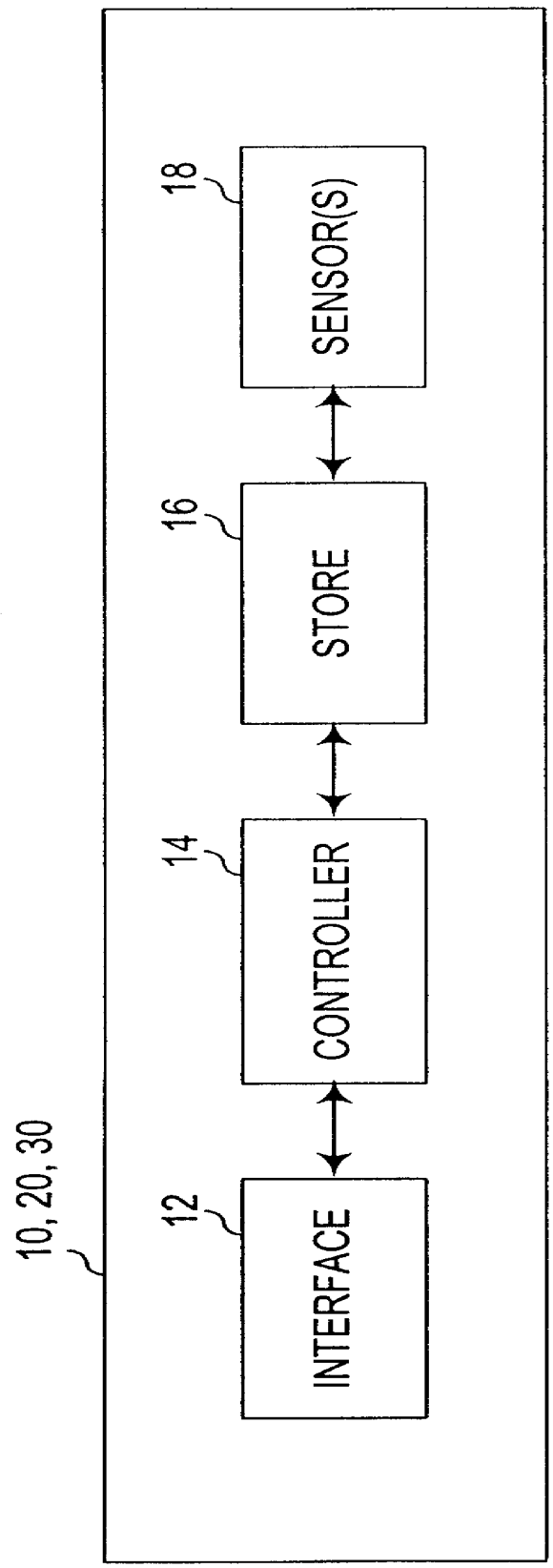
FIG. 4 is block diagram of client interface according to present invention.

FIG. 4 diagram shows client or site interface 10, 20, 30, including interface; coupling or application, controller or embedded processor; storage, cache or memory; and one or more network-accessible sensors. Such included client functionality may be provided in one or more integrated, programmable, reconfigurable, electronic devices, circuit, firmware, software and/or other equivalent implementation. Preferably controller 14 is implemented as programmed embedded digital signal processor, microprocessor, or reduced instruction set computing (RISC) microcontroller, such as commercial parts: 43001 from NEC Electronics (Santa Clara, Calif.), 4640/4650 from Integrated Device Technology (Santa Clara, Calif.), R5000/R8000/10000 from MIPS Technology (Mountain View, Calif.), PPC603/604 from IBM Microelectronics (Hopewell Junction, N.Y.) and Motorola (Austin, Tex.), 486DX4/486DX5 from Advanced Micro Devices (Austin, Tex.), PentiumPro/PentiumII from Intel (Chandler, Ariz.), UltraSPARC II/III from Sun Microsystems (Mountain View, Calif.), or Alpha 21164/21264 from Digital Equipment (Maynard, Mass.).

Generally, present embodiment may be implemented and/or performed using any digital local or wide-area network 4 wherein one or more addressable nodes (i.e., client and/or server) are coupled thereto for communication or transmission of packets, cells, frames, signals, or other electronic messages therebetween. Preferred network uses so-called Internet convention and World-Wide Web networking protocol for sending files, for example, according to specified formats, such as hypertext file transfer protocol (HTTP), universal resource locator (URL), hypertext markup language (HTML), extensible markup language (XML), transmission control protocol/Internet protocol (TCP/IP), etc. Thus, in this network arrangement, one or more servers and/or clients may remotely or locally access one or more servers coupled directly or indirectly thereto.

Initially, for functional operation of present embodiment, one or more client interface 10, 20, 30 is coupled to network 4, and such network is configured 40 wherein one or more informational expertise or data signal resources, such as provided centrally or distributedly by one or more modules 102, 104, 106, 108 in database 100.

For example, during or after initial set-up, resource pool in base server 102 may specify one or more expertise repositories or catalogs which may provide client-requested or downloadable text, audio, video, or other digital data. Moreover, during or after initial set-up, user client database 104 may be updated to indicate network connectivity and configuration between any servers and/or clients coupled thereto, as well as connectivity and configuration of any sensor or equivalent devices associated with one or more such clients. Furthermore, during or after initial set-up, user client database 104 may indicate one or more user-preferred network configuration, transaction selection, or sensor-related attribute. Additionally, during or after initial set-up, traffic operations module 106 may indicate client setup, network configuration, and security access parameters. In addition, during or after initial set-up, group registry module 108 may indicate client tracking state and client classification or grouping.

Preferably, one or more client interfaces 10, 20, 30 are configured and coupled in accordance with secure access channel and protocol 50 to network 4 to provide selectable access to one or more sensor 18 associated with particular client. Depending on client interface type, application or specific embodiment, for example, client interface 10 may serve as network interface for non-fixed pedestrian, vehicular or other moving processing site; client interface 20 may serve as network interface for personal, patient, medical or other telemedicine computing or communications environment; or client interface 30 may serve as network interface for multimedia equipment, residential appliance, office processing equipment, or other embedded controller or local processing application.

Hence, when client-server network is configured 40 for controlling expert resource or database access, and various client interface and sensors are coupled and accessible securely 50 thereto, then one or more applications programs may execute, preferably according to client and corresponding sensor implementation type, according to present invention to enable effectively adaptive direct transaction or messaging for one or more networked client group.

Sensor input signals from one or more client sites may be received continuously, scheduled at regular times, triggered by specified alarms or conditions, selectably activated by client or server, or adaptively or proportionately increased or decreased in sensing activity according to pre-specified or associated attributes, current related activity, or specified or monitored client group or set conditions or monitored activity.

In embodiment case of vehicle client interface 10, operational processing and sensing uses one or more microprocessor or embedded controller 14 electronically to monitor, diagnose and/or control data signals, alarm or out-of-specified range condition, pre-specified states, or other objectively detectable or attributes. Preferably, such sensed signal monitoring process is achieved using one or more local or embedded processing programs or applications provided in storage 16 executable by controller 14 for real-time access of one or more sensors or other signal feedback detector coupled thereto, such as temperature, pressure, accelerometer or movement sensors, (such as commercial integrated silicon or micromachined parts: AD741X and AD781X temperature sensors from Analog Devices (Norwood, Mass.), LM80, LM56, LM75 thermal sensors from National Semiconductor (Santa Clara, Calif.), XTR106 pressure sensors from Burr-Brown (Tucson, Ariz.), MPX10/50/100/2010/210d0/2700/5010/5006/5100/5700 pressure sensors from Motorola (Phoenix, Ariz.), or 7257AT accelerometer sensor from Endevco (San Juan Capistrano, Calif.), 40PC/4000PC pressure sensor from Honeywell (Freeport, Ill.), 19(C,U)005G pressure sensor from Sensym (Milpitas, Calif.), Titan pressure sensor from Lucas Control Systems (Hampton, Va.), DMU Turbo accelerometer sensor from Crossbow Technology (San Jose, Calif.), or MAP1452/XKP1260 pressure transducers from Integrated Sensor Solutions (San Jose, Calif.)).

It is contemplated that such client sensors 18 may be implemented in automotive, trucking or other terrestrial, airborne and/or marine transport systems or subsystems, such as mechanical (e.g., internal combustion engine timing, mechanical linkage stress or strain, transmission, and related drive train monitor, vehicle braking or brake anti-locking, fuel delivery and storage, passenger restraint, emergency condition, seatbelt securement or airbag deployment, or impact detection, diagnosis and/or control thereof), and/or electrical (e.g., engine ignition, lighting, thermal cooling/heating, entertainment, communication, dispatching, or navigational appliance or device, and/or other electronic module monitor, diagnosis and/or control thereof), etc.

In embodiment case of personal or patient client interface 20, operational processing and sensing uses one or more microprocessor or embedded controller 14 electronically to monitor, diagnose and/or control data signals, alarm or out-of-specified range condition, pre-specified states, or other objectively detectable or attributes through one or more sensors or other signal feedback detector, as described herein. Preferably, such sensed signal monitoring process is achieved using one or more local or embedded processing programs or applications provided in storage 16 and executable by controller 14 for real-time access of one or more sensors or other signal feedback detector coupled thereto.

It is contemplated that such client sensors 18 may be implemented in remote clinical, biometric, ambulatory medical, consultation, monitoring or communications systems or subsystems, particularly record-forwarding, patient-communication and observation, patient vital measurements, radiograph and other diagnostic image-transmission, for various specialties, such as radiology, dental, cardiorespiratory, constitutional, dermatology, ear-nose-throat, gastrointestinal, genitourinary, gynecological, musculoskeletal, neuropsychiatric, etc.

Optionally, sensors 18 may serve to detect or identify client-provided or specified organic material, particularly by obtaining probed or receiving analyzed input of one or more genetic sequence data of deoxyribonucleic acid (DNA) or protein of subject client, for example, for subsequent database alignment and/or comparison for similarity or matching against known identifiable sequences.

In embodiment case of office, home or school appliance client interface 30, operational processing and sensing uses one or more microprocessor or embedded controller 14 electronically to monitor, diagnose and/or control data signals, alarm or out-of-specified range condition, pre-specified states, or other objectively detectable or attributes through one or more sensors or other signal feedback detector, as described herein. Preferably, such sensed signal monitoring process is achieved using one or more local or embedded processing programs or applications provided in storage 16 and executable by controller 14 for real-time access of one or more sensors or other signal feedback detector coupled thereto.

It is contemplated that such client sensors 18 may be implemented for accessing, communicating with, monitoring, and controlling operations in multimedia entertainment, home or small office automation equipment, residential appliance devices, systems or subsystems, such as digital video disk players or recorders, personal computers, printers, copiers, fax machines, digital television, set-top boxes, security monitoring and alarm, etc.

Preferably, such electronic sensor-implementing components employ controller 14 processing code to interface to network 4 for sensor and interface access, signaling and control according to communication or signaling protocol, such as universal serial bus (USB), IEEE 1394 (i.e., FireWire), or other similar comparable interface specification. For example, such preferred interface for client appliance interface 30 complies with home audio/video interoperability (HAVI) architecture, which published specification is hereby incorporated by reference.

According to application program execution during operational processing and sensing 60, as described herein, client or user input and/or output (I/O) interface is provided, particularly to deliver signal or data download from network using dynamic display mechanism 70. Informational download, such as text (e.g., ASCII or Word processor format), audio(e.g., Real Audio format), still image (e.g., joint picture experts group (JPEG), 2 or 3 dimensional format), video (e.g., moving picture experts group (MPEG), or other catalog, expertise data pool, resource files or electronic digital material, are accessed from database 100 modules 102, 104, 106, 108. Optionally, such network client interface includes web browser software, such as available commercially from Microsoft (e.g., Internet Explorer) or Netscape (e.g., Communicator/Navigator).

Figure 6:
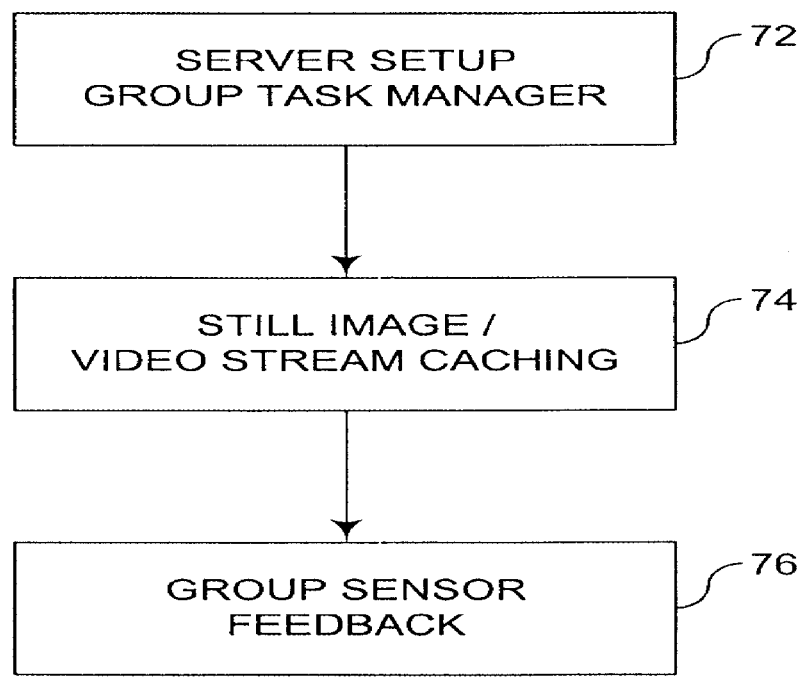
FIG. 6 is flow chart of operational steps for network download dynamic display according to present invention.

FIG. 6 flow chart shows group download display embodiment, wherein one or more servers initially setup to determine one or more clients associated with or belonging to specified sets or groups, thereby updating database client grouping 104, database registry client tracking 108, as well as any database traffic operation client setup and network configuration 106.

In particular, such determining server(s) may create and maintain current group or task manager, preferably as data table or system process to identify and monitor communications with or other network download to specified group members. Thus, based on initial client-server parameter setup, as well as subsequent updates thereto, accessing such task manager may provide effectively real-time organization of multi-member grouping data, and facilitates relatively fast informative response to authorized client or server query to determine current group definitions and members actively categorized therein. Additionally, such task manager program may serve to balance processing between group members, for example, such that directed messages or other transaction offerings are delivered more frequently or earlier to less-busy or higher-processing capacity client sites, as indicated in current database 100.

Further, display downloading scheme 70 includes faster-memory caching 74 of relatively larger data files, such as still image (e.g., .GIF, .JPG) and compressed video (e.g., MPG) files from database module download library 102. In addition, display downloading may include feedback signaling or equivalent communication 76 from one or more subject clients, which belong to common group client members, to provide accelerated current group membership indication to like group members. In this feedback-loop manner, group members may relatively quickly be alerted and display appropriate membership or non-membership status.

Preferably, network download dynamic display operations 70 provide subject server or client relatively high-resolution, flat-panel screen output with interactive multi-media capability (i.e., text, audio, still image, video, 3-D graphic or virtual media format, etc.), for example, using personal computer equipment or engineering workstation with processing encoded and compressed media signals, or interactive digital television having network-ready Internet or equivalent communications interface and applications protocol. Optionally, particular client may select to screen, block, filter or exclude from receiving one or more classes or attributes of incoming directed messages, such as undesirable commercial or immoral content.

Figure 5:
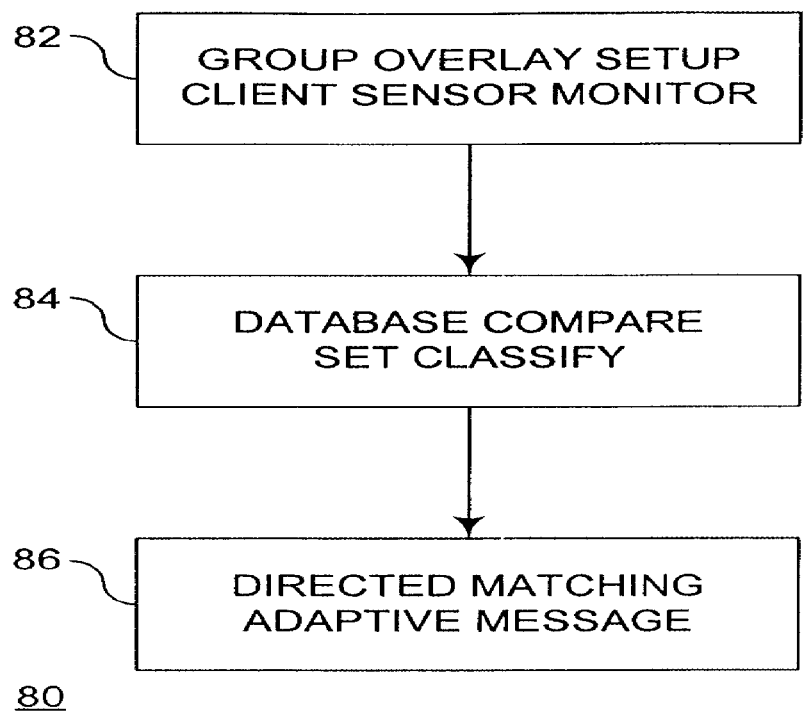
FIG. 5 is flow chart of operational steps for group analysis overlay according to present invention.

FIG. 5 flow chart shows operational steps for group analysis or system overlay thereof, according to important aspect of present invention, generally wherein Internet-based client interface 10, 20, 30 and associated database 100 effectively provide group analysis processing to monitor client-server web traffic and deliver direct marketing services to client group. As per alternative instances described herein, client car, patient, office or school sensors and interfaces provide attribute processing system overlay for database comparison to classify usage pattern, location, timing, or family for targeted messaging for enhanced service from server source. Database 100 group registry tracks client classification and provides adaptive context mapping according to set attribute relative to targeted on-line transaction.

Generally, group analysis 80 may be invoked automatically upon schedule or per directed request, thereby operating to determine groupings by comparing sensed 60 operational values with associated values stored in database 100. When group analysis 80 and subsequent directed offering transaction operations 90 are so invoked, for example, by network client or server with proper requesting authorization, preferably, one or more candidate client sites 10, 20, 30 are identified accordingly for classification. For example, in case of vehicle client interface 10, one or more clients having certain sensed or specified characteristics or other attributes, such as having certain serial or model numbers, tracked geographic location, etc., may be designated as candidate sites when considered for possible vehicle or product defect, repair, upgrade, or recall.

Initially, to perform proper group analysis, subject server 2 (or other network processor with access to database 100 and one or more candidate clients for present comparison) examines database 100, which may be implemented in one or more network-accessible data repositories, to determine 82 existence of any specified supergroups, groups, subgroups, in present network, and particularly search database modules 104, 108 recognize any such grouping which includes client to be evaluated for membership. Moreover, such subject server 2 may further search such database modules 104, 108 to determine and monitor existence of any or each sensor and characteristics thereof associated with each subject client for evaluation.

Then, database compare and set classify operations 84 are performed by subject server 2, whereby representative attributes or other sensed characteristics of candidate client(s) are logically compared to equivalent data field representations of other pre-registered or tracked clients in database 100 to determine matching or recognize substantial qualification for set groupings or non-groupings. Group registry 108 provides functional or graphical interface for searching fields for client and sensor attributes.

For example, in case of patient client interface 20, candidate patient sensed or specified attributes, such as geographical location, demographic family, race or ethnicity, medical insurance coverage, age, sex, etc. may be compared against other clients to generate certain groupings for subsequent targeted messaging or commercial offerings. Similarly, in case of appliance client interface 30, candidate appliance sensed or specified attributes, such as appliance model number, multimedia play-back capacity, entertainment preferences, usage pattern, budget allowance, schedule availability, etc. may be compared against other client to generate certain groupings. Upon candidate grouping classification, database 100 modules 104, 108 may be updated to reflect client membership accordingly.

Optionally, to provide network system client grouping scalability, when candidate client is determined not to be classifiable as analyzed, subject server 2 may modify group registry 108 to define set changes and create new super-group, group, or sub-group, as required by subject server.

Preferably, database registry 108 provides group classification with corresponding context mapping or topic relevance matching, thereby enabling directed matching for adaptive messages 86. Although such context mapping may be applied in case-specific manner, wherein specific rules or requirements for defining groups or clients having certain specified or sensed attributes are designated to receive targeted message broadcast, preferably, such context mapping may be achieved using less precise qualification scheme, such as fuzzy or statistical logical or topical association to generate list of possible candidates for targeted messaging. Upon completion of such context mapping, group registry 108 is updated. Additionally, context mapping scheme may be adapted to focus target candidates or reduce such directed client list for more precise marketing effect, preferably in response to real-time specified or sensed group or client attributes.

Figure 7:
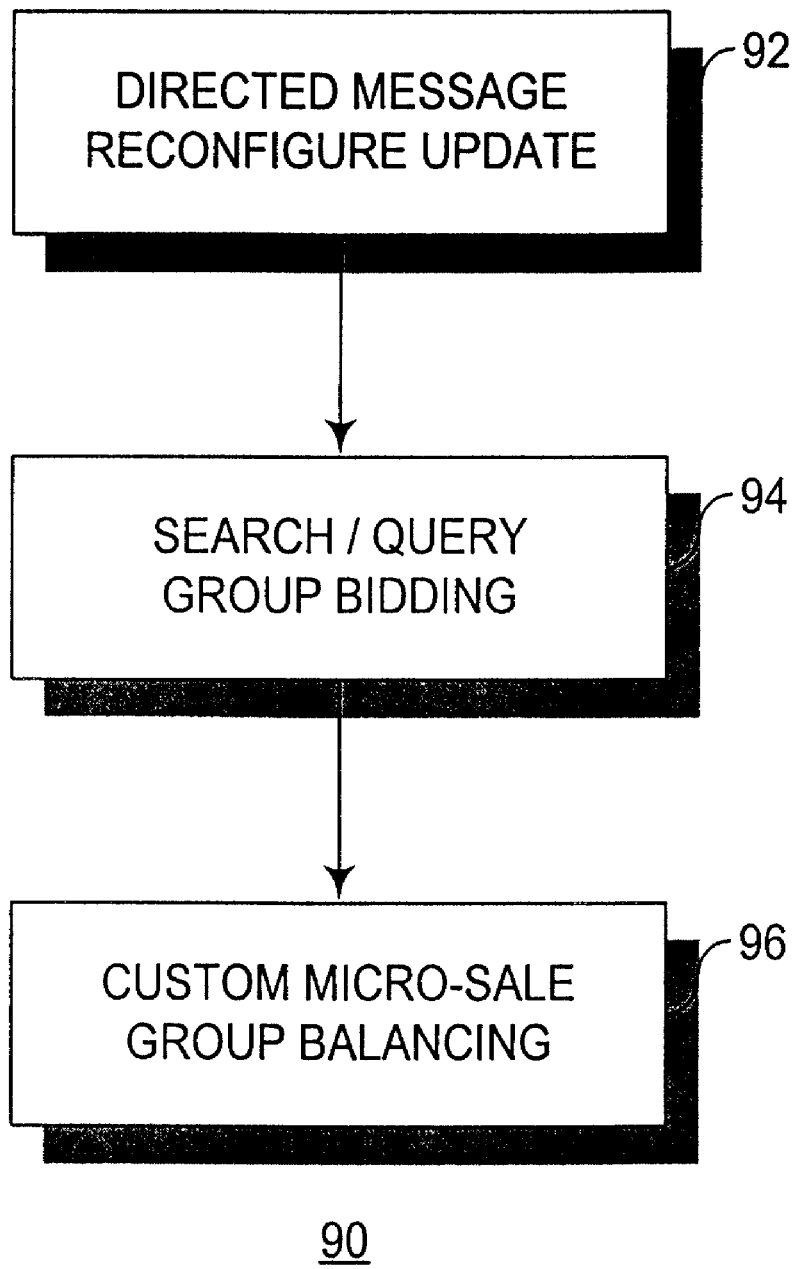
FIG. 7 is flow chart of operational steps for directed offering transaction according to present invention.

FIG. 7 flow chart shows directed offering transaction operation 90, wherein subject server 2 (or alternate network processor) generates and/or sources one or more directed or targeted message, which may include commercial, promotional, or marketing symbol, audio, text, still image, video, or other media content or signal for context-mapped or other designated clients within specified grouping(s). In particular, such directed messages may be downloaded from module 102, or other network source, and transmitted 92 through network 4 to designated client sites according to database 100 user client and grouping configurations and network connections specified in module 104, whereupon database 100 traffic operations module 106 is appropriately updated or reconfigured to reflect completed messaging.

Optionally, such directed messaging may be invoked by subject server 2 in response to one or more network searches or queries 92, for example, from other authorized server or client, or network search agent software application or process thereof, accessing group registry module 108 search interface to locate or identify one or more target groupings or clients therein, which qualify under certain specified or sensed attributes. Directed transactional messages 70 may be sent to targeted grouping(s), as well as client members therein, for prompt network download and display 70.

Furthermore, in auction style or similar bidding procedure, one or more such searching or querying network nodes or sources, or client members in particular grouping, may be designated or qualified to participate in on-line bidding or auction transaction, whereby highest price or other parameter bidder is provided specified merit rights or transaction.

In addition, when one or more such searching or querying network node or sources, or client members in particular grouping, is so designated or qualified, customized commercial terms, for example, for transacting so-called micro-sale or comparable limited per-use service billing 96 may be charged to such on-line customer according to actual network distribution or execution of transacted application service. In such micro-sale transaction, subject server 2 may prioritize access or directed messaging resources to targeted clients to achieve group balancing, whereby network computing performance, database resource access, and/or application or other service delivery are optimized.

Foregoing described embodiments of the invention are provided as illustrations and descriptions. They are not intended to limit the invention to precise form described. In particular, Applicants contemplate that functional implementation of invention described herein may be implemented equivalently in hardware, software, firmware, and/or other available functional components or building blocks. Other variations and embodiments are possible in light of above teachings, and it is thus intended that the scope of invention not be limited by this Detailed Description, but rather by Claims following.

What is claimed is:

1. Adaptive direct transaction method for interactive multi-media streaming to wirelessly locatable flat-panel network client group comprising steps:

group analysis overlaying by at least one software-automated task manager implemented by at least one processor coupled wirelessly to a plurality of wirelessly locatable flat-panel client devices, each flat-panel client device comprising a wirelessly locatable sensor that enables real-time tracking of flat-panel mobile usage or location pattern, and at least one electronically programmed or reconfigured processor, and thereby enabling sensor monitoring and device analysis overlay of the plurality of flat-panel client devices by the at least one software-automated task manager by automatically comparing and classifying the plurality of flat-panel client devices hierarchically into at least one of sub-group or super-group of wirelessly locatable flat-panel client devices; and directed offering transacting by the at least one software-automated task manager with at least one flat-panel client device classified hierarchically by the at least one software-automated task manager into the at least one of sub-group or super group by wirelessly streaming interactive multi-media for offering directly to such classified flat-panel client device of the at least one of sub-group or super-group adaptively according to real-time tracking by least one software-automated task manager implemented by the at least one electronically programmed or reconfigured processor of each classified flat-panel client device mobile usage or location pattern;

wherein at least one of the sensor comprises a global positioning system (GPS) receiver and accelerometer providing signal feedback that indicates out-of-range or movement alarm to the at least one software-automated task manager according to flat-panel client device product model, upgrade or defect;

monitoring by the at least one software-automated task manager the GPS receiver or accelerometer of the plurality of flat-panel client devices and hierarchically grouping the plurality of flat-panel client devices based on real-time tracking of flat-panel mobile usage or location pattern;

contextually mapping by the at least one software-automated task manager the at least one sub-group or super-group to a single interactive multi-media stream, thereby enabling the directed offering of the single interactive multi-media stream to flat-panel client devices grouped in a hierarchical manner;

dynamically enabling by the at least one software-automated task manager adaptive direct transaction for interactive multi-media streaming singly to wirelessly locatable flat-panel network client device of the at least one of sub-group or super-group in real-time according to media-, mobile- or bio-sensing of each client device, processing by the at least one software-automated task manager using group overlay software one or more media-,mobile- and bio-sensor database associated with each client device in the network client device the at least one of sub-group or super-group, classifying by the at least one software-automated task manager each client device adaptively into the network client device of the at least one of sub-group or super-group by using said group overlay software to compare each client device media-, mobile-, or bio-sensor data and said group overlay software;

enabling direct offering transaction automatically via single interactive multi-media stream to each client device in the network client device sub-group or super-group adaptively according to each client device media-, mobile-, and/or bio-sensor data;

using by the at least one of said plurality of wirelessly locatable flat-panel client devices said at least one software-automated task manager to provide telemedicine diagnostic computation or communication service adaptively according to at least one of: medical condition, bio-sensor condition or demographic attribute associated with at least one of: equivalent or substantially similar personal protein or genetic sequence, said personal protein or genetic sequence is received as at least one of: sensor-sampled or input-verified personal protein or genetic sequence, thereby providing the at least one directed offering transaction by said at least one software-automated task manager adaptively according to said at least one of: medical condition, bio-sensor condition or demographic attribute associated with said at least one of: equivalent or substantially similar one or more sensor-sampled or input-verified personal protein or genetic sequence.

\* \* \* \* \*